United States Patent [19]
Bellini et al.

[11] Patent Number: 5,974,395
[45] Date of Patent: *Oct. 26, 1999

[54] SYSTEM AND METHOD FOR EXTENDED ENTERPRISE PLANNING ACROSS A SUPPLY CHAIN

[75] Inventors: Joseph M. Bellini, Tory, Mich.; Jon R. Kirkegaard, Dallas, Tex.; Gregory A. Brady, Colleyville, Tex.; Arthur H. Altman, Dallas, Tex.

[73] Assignee: i2 Technologies, Inc., Irving, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,261

[22] Filed: Aug. 21, 1996

[51] Int. Cl.⁶ .......................... G06F 15/20; G06F 15/21; G06F 17/30; G06F 17/230
[52] U.S. Cl. ................................. 705/9; 705/10; 705/28; 705/29; 705/34; 705/26
[58] Field of Search .................................. 705/9, 10, 28, 705/29, 26, 34

[56] References Cited

U.S. PATENT DOCUMENTS

| | | | |
|---|---|---|---|
| 4,799,156 | 1/1989 | Shavit et al. | 705/26 |
| 5,450,317 | 9/1995 | Lu et al. | 705/10 |
| 5,524,253 | 6/1996 | Pham et al. | 395/200.32 |
| 5,570,291 | 10/1996 | Dudle et al. | 364/468.01 |
| 5,594,721 | 1/1997 | Pan | 370/392 |
| 5,638,519 | 6/1997 | Haluska | 705/28 |
| 5,666,493 | 9/1997 | Wojcik et al. | 705/26 |
| 5,694,551 | 12/1997 | Doyle et al. | 705/26 |
| 5,712,989 | 1/1998 | Johnson et al. | 705/28 |
| 5,884,300 | 3/1999 | Brockman | 707/2 |

FOREIGN PATENT DOCUMENTS

| | | | |
|---|---|---|---|
| 0600448 | 6/1994 | European Pat. Off. | G06F 15/24 |

OTHER PUBLICATIONS

PCT International Search Report; Mailing Date Jan. 23, 1998.

Document XP–002051324 by R.M. Cowdrick entitled "Supply Chain Planning (SCP)—Concepts and Case Studies," *Computers ind. Engng* vol. 29, No. 1–4, pp. 245–248, 1995.

Document XP–002051325 by N.C. Simpson, et al. entitled "Multiple–Stage Production Planning Research: History and Opportunities," *International Journal of Operations & Production Managment*, vol. 16, No. 6, pp. 25–40, 1996.

(List continued on next page.)

*Primary Examiner*—Allen R. MacDonald
*Assistant Examiner*—James W. Myhre
*Attorney, Agent, or Firm*—Baker & Botts L.L.P.

[57] ABSTRACT

A system for extended enterprise planning across a supply chain is provided. The system includes transactional execution system layers (14, 18) for a demand enterprise (10) and a supply enterprise (12). First and second federated electronic planning interchange layers (16, 20) provide a data specification format and an external communication interface for transactional execution system layers (14, 18). A supply chain planning engine (22), operable to perform planning for the supply chain, is in communication with a third federated electronic planning interchange layer (24) which provides a data specification format and an external communication interface for the supply chain planning engine (22). A data access/transfer layer (28) interconnects and allows transfer of information between the first, second and third electronic federated planning interchange layers (16, 20, 24). The supply chain planning engine (22), the first transactional execution system (14) and the second transactional execution system (18) can thereby communicate data which the supply chain planning engine (22) can use to provide constraint based extended enterprise planning across the supply chain.

16 Claims, 5 Drawing Sheets

OTHER PUBLICATIONS

Document XP–002051326 by Simon Sutton entitled "When the JIT Starts to Fly Is It Time to Keep Your Head Down or Go for ISC?" ; *Logistics Information Management*, vol. 7, No. 5, pp. 36–43, 1994.

Document XP–002053127 by J. Salemi, et al. entitled "Linking EDI to MRPII to Reduce Cycle Time"; *IEEE*, pp. 558–570, 1994.

Document XP–002051328 by D. Little, et al. entitled Scheduling Across the Supply Chain; *Logistics Information Management*, vol. 8, No. 1, pp. 42–48, 1995.

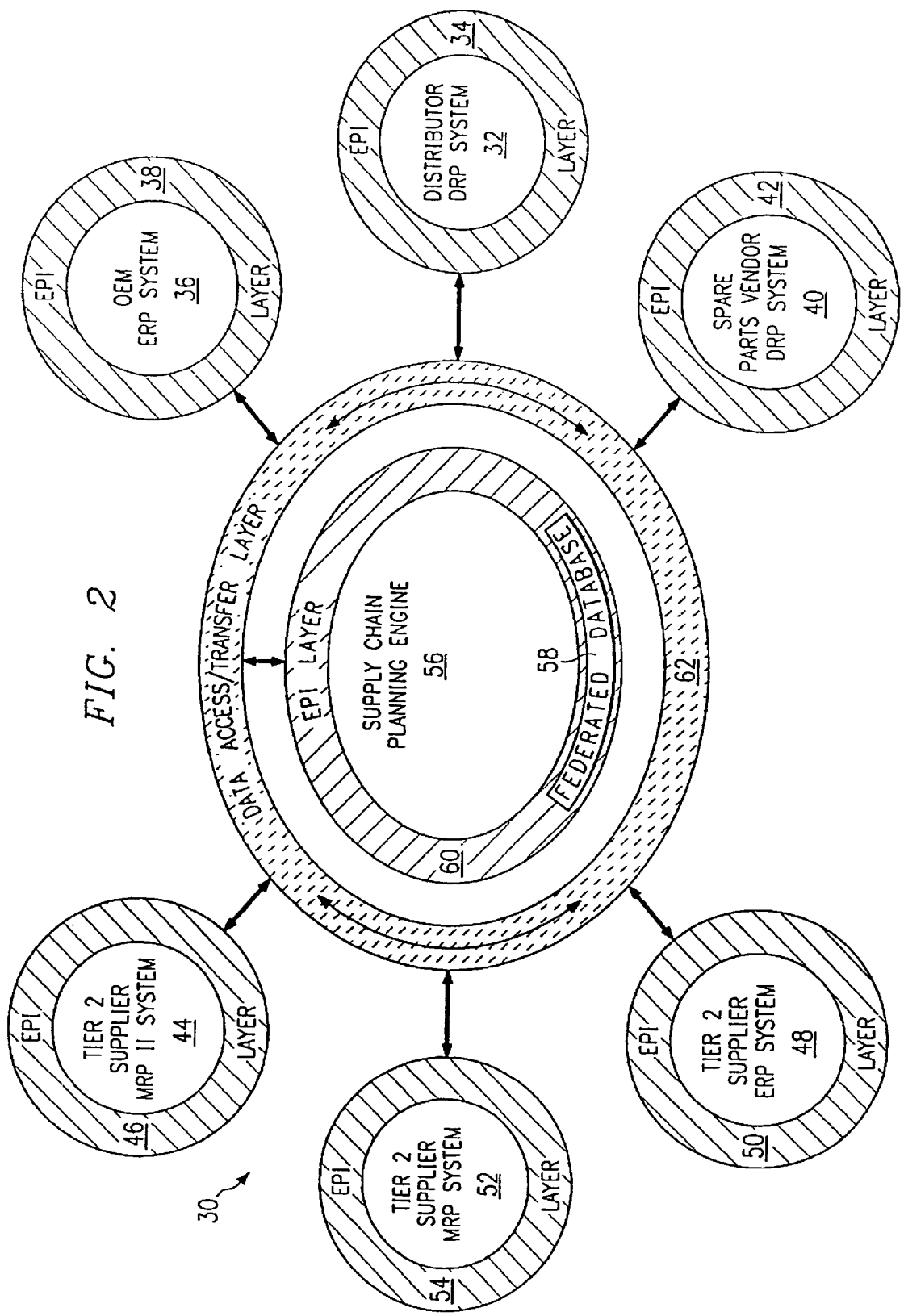

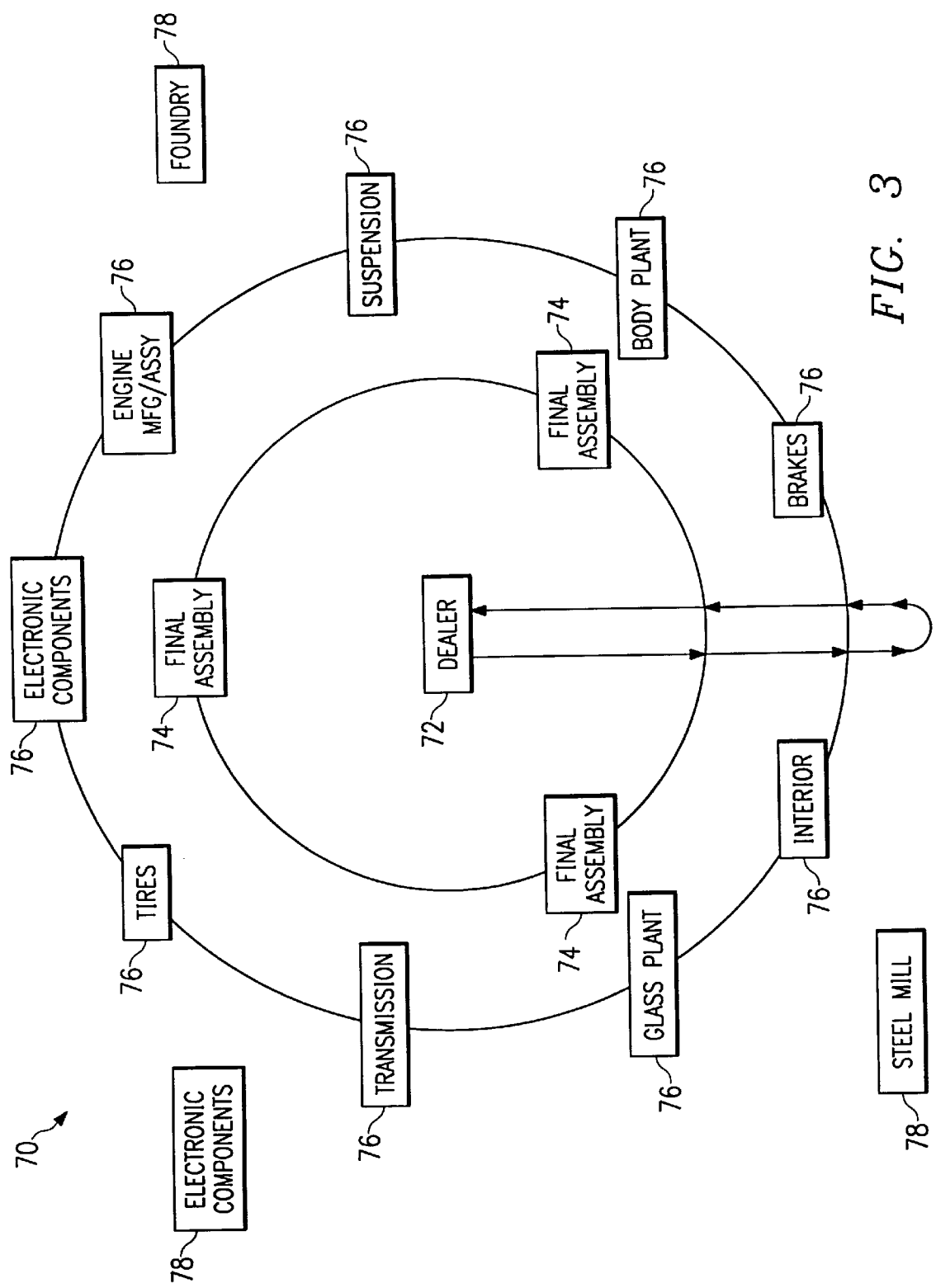

SYSTEM AND METHOD FOR EXTENDED ENTERPRISE PLANNING ACROSS A SUPPLY CHAIN

TECHNICAL FIELD OF THE INVENTION

This invention relates in general to the field of electronic systems, and more particularly to a system and method for extended enterprise planning across a supply chain.

BACKGROUND OF THE INVENTION

Planning systems are used by enterprises in various industries to plan operations. Conventional transactional execution systems include ERP (Enterprise Requirements Planning), MRP and MRPII (Material Requirements Planning), and DRP (Distribution Requirements Planning) type systems. Other, more complex systems can be used to integrate enterprises and execute planning strategies provided the enterprises use compatible data specification formats. One such complex system is the RHYTHM system available from I2 TECHNOLOGIES located in Dallas, Tex. The RHYTHM System uses a flexible network based approach of operations, resources and buffers to model a supply chain rather than a traditional hierarchical approach.

Conventional transactional execution systems such as the ERP/MRP/DRP type systems are typically architected as hierarchical to pass data between independent nodes rather than to solve planning and scheduling problems as they exist throughout a supply chain. Dependencies for multiple enterprises between demand, material, capacity, logistics, customer allocations, supplier allocations, and related business constraints are not solved by these conventional systems. When using conventional transactional execution systems, each enterprise generates its own plan from its point of view. Sequential data transfer between enterprises in a supply chain is used to share information. This transfer of data can provide some information to aid the planning of operations for an enterprise.

One conventional technology used by enterprises to share information is EDI (Electronic Data Interchange). This protocol provides a way to administer change management and control within a supply chain. However, EDI has problems with respect to achieving customer driven goals such as real time order promising and true supply chain cost optimization, assembly coordination, and inventory deployment. Using the automotive industry as an example, a considerable portion of the cost build up for a vehicle is overhead in the supply chain due to attempts to plan operations based upon old, inaccurate or limited information. Even with EDI, the lack of bidirectional vertically integrated production plans within the supply chain causes problems in that plans are constructed based upon old or inaccurate information and material and capacity exceptions at each level are not solved before requirements are passed to the next level in the supply chain, thus compounding problems down the supply chain.

In general, supply chains can be placed into one of two categories: tightly coupled or loosely coupled. A tightly coupled supply chain is one in which there is little substitution of vendors or suppliers of materials and parts within the supply chain. These types of supply chains are characterized by complex bills of materials and by products that have a higher sophistication with requirements that are more detailed and more deeply involved. Tightly coupled supply chains are generally lean in that they are characterized by a low inventory environment. An example of a tightly coupled supply chain is the automotive industry. On the other hand, a loosely coupled supply chain is one in which there is relatively heavy substitution between vendors and suppliers of products and parts. An example of a loosely coupled supply chain is a consumer packaged goods supply chain such as one driven by customer demand at a large retail store.

Conventional planning processes implemented by enterprises in either type of supply chain are not characterized by close cooperation. Generally, the supply chains are composed of separate enterprises with each running a separate transactional execution system. The degree of planning across the enterprises to plan for the whole supply chain is relatively nonexistent. Consequently, it becomes difficult to effectively coordinate and create business relationships that efficiently and effectively fills customers needs. It is desirable to plan for the entire supply chain, as closely to real time as possible, and to propagate information forward and backward between enterprises.

SUMMARY OF THE INVENTION

In accordance with the present invention, a system and method for extended enterprise planning across a supply chain are provided that substantially eliminate or reduce disadvantages and problems associated with prior planning systems and methods.

According to one embodiment of the present invention, a system for extended enterprise planning across a supply chain is provided. The system includes at least one transactional execution system layer for a demand enterprise that is in communication with a first federated electronic planning interchange layer. The first federated electronic planning interchange layer provides a data specification format and external communication interface for the demand enterprise's transactional execution system layer. The system also includes at least one transactional execution system layer for a supply enterprise that is in communication with a second federated electronic planning interchange layer. The second federated electronic planning interchange layer provides a data specification format and external communication interface for the supply enterprise's transactional execution system layer. A supply chain planning engine, operable to perform planning for the supply chain, is in communication with a third federated electronic planning interchange layer which provides an external communication interface for the supply chain planning engine. A data access/transfer layer interconnects and allows transfer of information between the first, second and third federated electronic planning interchange layers. The supply chain planning engine, the first transactional execution system and the second transactional execution system can thereby communicate planning information which the supply chain planning engine can use to provide extended enterprise planning across the supply chain.

The ability to operate bi-directionally within a flexible supply chain network to allow integrated planning and scheduling information both horizontally and vertically is a technical advantage of the present invention. The EPI layer of the present invention interconnects the enterprises and allows the supply chain planning engine to see the entire supply chain and solve problems for the entire supply chain. The present invention allows access to data outside a single enterprise's transactional data, thus creating an extended enterprise planning environment. The EPI layer can be implemented for enterprises running disparate transactional execution systems already in place at each enterprise. The transfer of information between enterprises can include a commitment to the exchange of data as well as to the timing (federation) of the exchange which enables the execution of effective planning strategies across the supply chain.

Another technical advantage of the present invention is the reduction of average inventory levels in enterprises in a loosely coupled supply chain and the reduction of overhead costs in a tightly coupled supply chain through the execution of planning strategies for the entire supply chain.

The extended enterprise planning system and method of the present invention further provide a technical advantage of allowing substantially just-in-time planning for an a supply chain. In addition, a feasible plan can be maintained throughout the supply chain, and allocated available-to-promise (ATP) buffers can be established at each enterprise.

The electronic planning interchange data protocol of the present invention can provide a format and timing for data required at each tier within a supply chain so that a supply chain planning engine can operate to provide an integrated infrastructure that supports bi-directional propagation of planning and scheduling information in a real time format. This ability to plan and schedule an entire supply chain is a technical advantage of the present invention. The electronic planning interchange data protocol also provides business requirements to execute the supply chain. Using the EPI data protocol, an enterprise can enforce business policies, rules, procedures, data dependencies and timing which are key elements to drive planning across the supply chain.

BRIEF DESCRIPTION OF THE DRAWINGS

A more complete understanding of the present invention and the advantages thereof may be acquired by referring to the following description taken in conjunction with the accompanying drawings, in which like reference numbers indicate like features and wherein:

FIG. 2 is a block diagram of another embodiment of a system for extended enterprise planning across a supply chain according to the teachings of the present invention;

FIG. 3 is a block diagram of one embodiment of enterprises in an automotive supply chain;

DETAILED DESCRIPTION OF THE INVENTION

Figure 1:
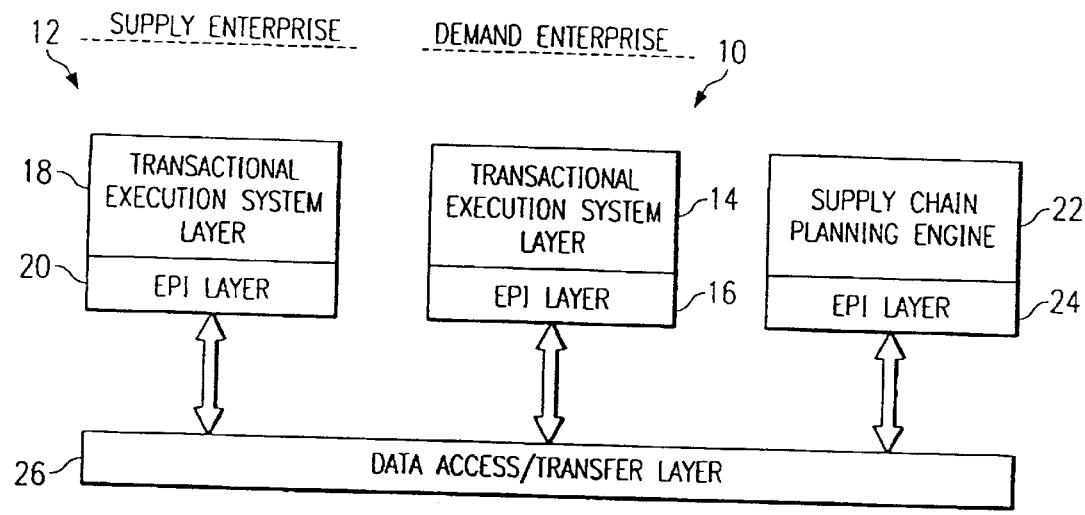
FIG. 1 is a block diagram of one embodiment of a system for extended enterprise planning across a supply chain according to the teachings of the present invention.

FIG. 1 is a block diagram of one embodiment of a system for extended enterprise planning across a supply chain according to the teachings of the present invention. A demand enterprise 10 and a supply enterprise 12 of FIG. 1 are two enterprises within a supply chain. Demand enterprise 10 represents an enterprise where demand for a product or part is generated. For example, demand enterprise 10 can be a distributor or other point of sale entity. Supply enterprise 12 represents an enterprise that supplies demand generated at demand enterprise 10. It should be understood that a supply chain typically would include numerous demand and supply enterprises and that some enterprises can both generate and supply demands.

Demand enterprise 10 includes a transactional execution system layer 14. Transactional execution system layer 14 represents a system such as an ERP/MRP/DRP transactional execution system. A federated electronic planning interchange (EPI) layer 16 is in communication with transactional execution system layer 14. Transactional execution system layer 14 and EPI layer 16 can be established by software executing on a computer system located at demand enterprise 10. Supply enterprise 12 similarly includes a transactional execution system layer 18 in communication with a federated EPI layer 20. Transactional execution system layer 18 and EPI layer 20 can be established by software executing on a computer system located at supply enterprise 12.

A supply chain planning engine 22 is in communication with a federated EPI layer 24 which is interconnected with EPI layer 16 and EPI layer 20 by a data transfer layer 26. Supply chain planning engine 22 can be established by software executing on a computer system that is, for example, neutral with respect to each enterprise in the supply chain or that is under the control of a supplier demand enterprise 10. In general, for a loosely coupled supply chain, supply chain planning engine 22 can be closely associated with a supplier demand enterprise 10 that is at the top of the supply chain. For a tightly coupled supply chain, supply chain planning engine 22 can be neutral with respect to the enterprises within the supply chain and provide, for example, a value added network. In one embodiment of the present invention, supply chain planning engine 22 can be implemented using a RHYTHM planning engine available from I2 TECHNOLOGIES. In one embodiment of the present invention, data access/transfer layer 26 uses the public Internet or a private intranet to provide a communication pathway. In another embodiment of the present invention, data access/transfer layer 26 is implemented using a private LAN or WAN network. It should be understood, however, that there are other ways to implement data access/transfer layer 26.

Transactional execution system layer 14 executes a feasible plan or schedule derived from supply chain planning engine 22 for demand enterprise 10, and transactional execution system layer 18 executes a feasible plan or schedule derived from supply chain planning engine 22 for supply enterprise 12. EPI layer 16 and EPI layer 20 provide a data specification format and external communication interface for transactional execution system layer 14 and transactional execution system layer 18, respectively. EPI layers 16 and 20 communicate information using an electronic planning interchange data protocol according to the teachings of the present invention. Supply chain planning engine 22 performs planning for the supply chain, and EPI layer 24 provides a data specification format and external communication interface for supply chain planning engine 22 using the electronic planning interchange data protocol. EPI layers 16, 20 and 24 are connected by and communicate information across data access/transfer layer 26. Supply chain planning engine 22 can thereby communicate planning information with transactional execution system layer 14 and transactional execution system layer 18 in order to receive information and provide extended enterprise planning for the supply chain.

According to the teachings of the present invention, EPI layer 16 and EPI layer 20 are placed in communication with transactional execution system layers 14 and 18 to interface with those systems and to communicate information from those systems to supply chain planning engine 22. EPI layer 24 provides the interface between supply chain planning engine 22 and EPI layers 16 and 20. The electronic interchange data protocol used by EPI layers 16, 20, and 24 provides a scheme for the format and timing of information. In this manner, supply chain planning engine 22, and transactional execution system layers 14 and 18 are allowed to communicate with one another and share information sufficient to plan the supply chain. This supply chain planning can be implemented on top of transactional execution systems already in place at demand enterprise 10 and supply enterprise 12. In addition, supply enterprise 12 and demand enterprise 10 can use transactional execution systems that are not originally designed to directly interact.

Supply chain planning engine 22 can communicate information bi-directionally with transactional execution system layers 14 and 18 using information formatted according to the electronic planning interchange data protocol. This data protocol can require, among other things, that demand enterprise 10 and supply enterprise 12 commit to honoring the planning data they provide and to following certain timing considerations for the data.

According to the present invention, the electronic planning interchange data protocol can establish standards to support decision making across the supply chain. Certain functionality in the protocol can be important in order to achieve desired benefits across the supply chain. This functionality includes, but is not limited to, implementing business policies, rules, and procedures; providing optimal supply chain design through model definition; allowing supply chain inventory visibility; allowing supply chain capacity visibility; optimizing the inventory/capacity dependency across the supply chain; optimizing transportation/distribution; implementing time sensitive business rules; allowing available to promise; providing automatic planning notification of enterprises involved; providing dynamic registering and deregistering of enterprises; having multiple levels of security; and authenticating buyer and seller enterprises within the supply chain.

In general, infrastructure areas of data and timing are provided by EPI layers 16, 20 and 24 of the present invention. With respect to data, certain information can be required to be made accessible by demand and supply enterprises 10 and 12 to supply chain planning engine 22. This data can include, but is not limited to, capacity, material and demand information. Capacity information can refer to planned capacity volumes for work in process (end item parts), capacity resources and inventory planning. Material information can refer to releases, shipments, inventory profiles, available to promise (ATP), costs, suppliers, and alternates. Demand information can refer to customer requirements, promise dates, customer satisfaction, location and status. Timing can be a crucial element in determining the effectiveness of supply chain planning engine 22. Without a relatively rigorous standard that defines the windows that are open to each demand or supply enterprise 10 or 12 within the supply chain to process a request, the communication between levels of the supply chain can break down. Thus, according to the teachings of the present invention, timing standards are defined for demand and supply enterprises 10 and 12 in the supply chain. These timing requirements allow information to be passed in a timely fashion to and from lower tier suppliers within the supply chain.

According to the teachings of the present invention, supply chain planning engine 22 acts on the information provided by the various demand and supply enterprises 10 and 12. Supply chain planning engine 22 can provide gross requirements explosion, variability analysis (planning, forward, backward, pull, point of use, JIT/agile/sequencing requirements), measurement tracking, and inter-level communication.

A system for extended enterprise planning, according to the teachings of the present invention, can provide enterprise to enterprise communication logic, which can be referred to as request/promise logic, to drive the exchange of planning data in a timely fashion. Change propagation can be managed forward and backward, and vertically and horizontally within the supply chain. A request or promise can be executed between any enterprise within the supply chain. Request/promise logic can be integrated within business policies, rules, or procedures that have been defined as part of the supply chain model. In some situations, such as when two enterprises are part of the same company, the request/promise logic can be set up to operate automatically within that company so there is no delay in propagating demand changes through the supply chain.

According to the present invention, five concepts can be considered to lay foundation for driving agility into planning the supply chain. A first concept is that of constraint management. This is a concept that businesses require feasible solutions. Plans that fail to consider real world constraints are of limited use. Effective supply chain management means recognizing and minimizing the impact of many types of constraints: materials, capacity, manpower, transportation, warehousing, suppliers, management policies, customer and channel allocations, and others.

A second concept is that of concurrent versus serial planning. Conventional planning is done sequentially or serially—with separate plans for manufacturing, procurement, transportation, sourcing, allocation, and distribution—resulting in unsynchronized plans. According to the present invention, systems can be capable of concurrent planning across the supply chain, resulting in faster plan generation and synchronized, responsive supply chain.

A third concept is that of global insight. With constraint management and concurrent planning, an organization can grasp the global (i.e., supply claim wide) impact of local changes on the supply chain. This allows an enterprise to make a globally good decision rather than one that is just good for that specific enterprise.

Another concept is that of advanced warning. When a local change occurs—whether it is an expedited order, unscheduled equipment downtime, or the failure of a supplier to perform to expectations—a system can relay an advance warning to other enterprises or stake holders in the supply chain. This warning can define the local change in terms of its affect on demand at all tiers within the supply chain, as well as its affect on sales, inventory and work in process levels, lead times and due dates. This visibility provides important information for meeting an organization's business objectives.

A further concept is that of built in business optimization. Because business scenarios change constantly, the present invention provides a means for rapidly recommending new operational solutions that can maximize quantifiable business objectives such as return on assets, profit contribution and cash flow. The decision support logic can accommodate different business optimization criteria.

In general, the system of the present invention can provide a good supply chain solution for transportation, factory and warehouse sourcing, allocation of materials and capacity, inventory replenishment, manufacturing, and purchasing. It also provides the ability to predict the impact of change on all enterprises and provides improved and timely request to promise reliability on a global basis. In addition, true multi-enterprise outsourcing and procurement capabilities (which include suppliers and customers) as well as increased product customization capabilities can be realized. Enterprises can be allowed to gain orders from potential customers, translate those orders into production requirements, request demand fulfillment from suppliers, receive confirmation, and deliver the promise date and subsequent product to the customer, all while maximizing supply chain performance. This can be implemented across enterprises that are not integratable and are otherwise not designed to enable quick response.

Interconnection of a Supply Chain

FIG. 2 is a block diagram of one embodiment of a system, indicated generally at 30, for extended enterprise planning across a supply chain according to the teachings of the present invention. System 30 provides an example of a supply chain having a number of enterprises running transactional execution systems interconnected with each other and a planning engine by EPI layers.

System 30 includes a distributor which is running, for example, a DRP transactional execution system 32. An EPI layer 34 is in communication with DRP system 32. An original equipment manufacturer (OEM) is operating an ERP transactional execution system 36 which is in communication with an EPI layer 38. A spare parts vendor is operating a DRP transactional execution system 40 which is in communication with an EPI layer 42. A first tier supplier is operating an MRPII transactional execution system 44 which is in communication with an EPI layer 46, and another first tier supplier is operating an ERP transactional execution system 48 which is in communication with an EPI layer 50. Lastly, a second tier supplier is operating an MRP transactional execution system 52 which is in communication with an EPI layer 54. A supply chain planning engine 56 is in communication with an EPI layer 60 which includes a federated database 58, as shown. Each of the EPI layers 34 through 60 are interconnected by data access/transfer layer 62 which allows communication of information between the EPI layers using an electronic planning interchange data protocol.

In the illustrated embodiment, the distributor originates demands for the entire supply chain. In other words, it is the distributor that sells product and generates initial demands for the supply chain based upon those sales. The distributor might be, for example, in the business of selling personal computers. The distributor can receive products from the OEM as well as spare parts from the spare parts vendor. The OEM has two first tier suppliers, one or both of which is supplied by the second tier supplier. In this example supply chain, demand originates from the distributor and propagates back to the second tier supplier, and promises to supply products/parts propagate forward to the distributor.

According to the present invention, communication of planning information is enabled by using the respective EPI layers to link the transactional execution systems operated by the enterprises. Thus, each enterprise can communicate information using the electronic planning interchange data protocol, and supply chain planning engine 56 can thereby integrate planning across the supply chain.

Supply chain planning engine 56 performs planning for all of the enterprises in the supply chain. In one implementation, each transactional execution system can be enhanced by an application program interface (API) which implements the respective EPI layer. These API's can hook into the existing transactional execution systems operated by each enterprise in the supply chain. The various EPI layers can then communicate planning information to supply chain planning engine 56 and to one another. In another implementation, federated database 58 provides a central site for each of the enterprises to store planning related information which can then be accessed by supply chain planning engine 56. Supply chain planning engine 56 can access the planning information, plan for the supply chain, and provide planning information for the various enterprises by storing information in federated database 58.

The electronic planning interchange data protocol used by the EPI layers provides a common format and rules for communication of planning information. In one embodiment of the present invention, the electronic planning interchange data protocol uses the formats set forth in the following tables for communicating requests and promises.

TABLE 1

Delivery_Request

Name of Creator, e.g., Computer Co. Plan "A"
Creator's Name of Object, e.g., P.O. #123456
Receiver's Name of Object, e.g., P.O. #ABCDEF
Remark String, e.g., "Emergency Order Received from Key Customer"
Issuance Date, e.g., 96/05/05 00:00:00
   date the request was issued
Expiration Deadline, e.g., 96/05/05 00:00:00
   if no promises are offered by this date, the request is withdrawn
Accepted Date, e.g., 96/05/05 00:00:00
   date the offered delivery promises were accepted
Delivery Due Date, e.g., 96/05/05 00:00:00
   when I want what I'm asking for
Delivery Destination Remarks, e.g., "Address, Phone, . . ."
Item Name, e.g., SKU #ZXC
Quantity, e.g., 12

TABLE 2

Delivery_Promise

Offered Date, e.g., 96/05/05 00:00:00
   when the promise was offered
Acceptance Deadline, e.g., 96/05/05 00:00:00
   if this deadline passes without acceptance by the requester, the promise is withdrawn
Planned Delivery Date, e.g., 96/05/05 00:00:00
Item Name, e.g., SKU #ZXC
Quantity, e.g., 12

According to the teachings of the present invention, execution of planning and scheduling at the supply chain level are implemented by allowing supply chain planning engine 56 to create and plan for a model of the entire supply chain. This virtual model can be created by the planning information communicated to supply chain planning engine 56. Supply chain planning engine 56 can proactively strip federated data from EPI layers 34, 38, 42, 46, 50 and 54 and can poll EPI layer 60 in a reactive fashion, thus providing both proactive and reactive planning capability. The standards defined by the EPI layers and electronic planning interchange data protocol integrates planning information by hooking into various types of transactional execution systems and providing planning information in a common format. According to the present invention, by processing the whole supply chain planning problem concurrently, the benefit of opportunities to the entire supply chain can be identified and implemented.

Automotive Supply Chain

FIG. 3 is a block diagram of one embodiment of an automotive supply chain, indicated generally at 70, which can be considered a tightly coupled supply chain. Supply chain 70 has, at its center, a dealer enterprise 72. Outward from dealer enterprise 72 are three final assembly enterprises 74. Outward from final assembly enterprises 74 are a number of enterprises 76 that supply parts to final assembly enterprises 74. These enterprises 76 include businesses that supply electronic components, engines, suspensions, bodies, brakes, interiors, glass, transmissions, and tires. Outward from enterprises 76 are additional enterprises 78 that supply other materials including electronic components, a foundry, and a steel mill.

According to the teachings of the present invention, supply chain 70 can be integrated using the supply chain planning engine and EPI layers described above. With this integration, requests can be transferred out from dealer 72 and promises can be returned back to dealer 72 so that dealer 72 can respond to a customer demand with a relatively precise promise date. Dealer 72 could generate a plan, send out appropriate demands, receive promises, and know accurate dates for delivery of vehicles to dealer 72's customers. Where there is one planning domain, simulations of plans for the supply chain can occur, for example, in five to ten minutes across the network of enterprises. Where there are multiple planning domains and there is sufficient available to promise, plan development can occur, for example, in one to two minutes across the network of enterprises.

Where there is insufficient available to promise and multiple planner domains, due to the business process constraints, dealer 72 can send requests to final assembly enterprises 74 before 9:00 a.m. in the morning. According to the EPI protocol, final assembly enterprises 74 can be required to provide requests to enterprises 76 by 11:00 a.m. in the morning. Enterprises 76 can then be required to provide requests to outer enterprises 78, if any, by 2:00 p.m. in the afternoon. In this scheme, promises can then be transferred back from outer enterprises 78 to enterprises 76 by 4:00 p.m. Promises can be returned to final assembly enterprises 74 by 5:00 p.m., and promises can be returned to dealer 72 by 6:00 p.m. A planning engine can then process the demand and promise information generated during the day and produce a plan for the supply chain for the week.

In this manner, dealer 72 can be provided with accurate promise information for delivery of finished vehicles. This planning process also can identify enterprise links in the supply chain causing delays and warn those links of that status. Strategies for avoiding delays can then be developed such as by finding substitutions for those links or correcting problems at those links.

Consumer Packaged Goods Supply Chain

Figure 4:
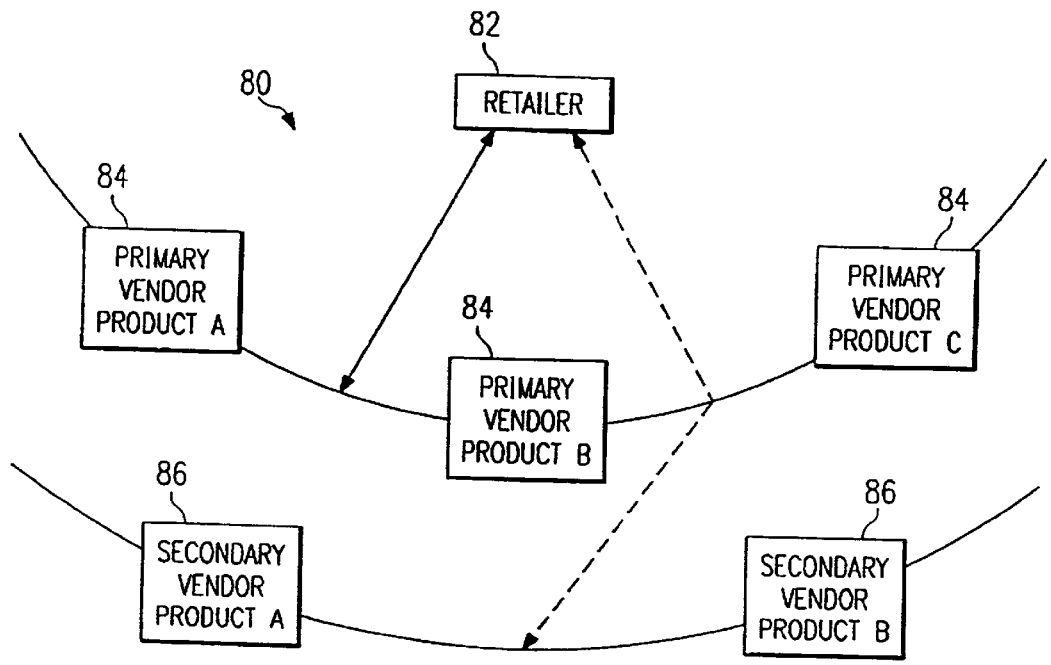
FIG. 4 is a block diagram of one embodiment of enterprises in a consumer packaged goods supply chain.

FIG. 4 is a block diagram of one embodiment of a consumer packaged goods supply chain, indicated generally at 80, which is a loosely coupled supply chain. A retailer enterprise 82 receives products A, B and C from primary vendor enterprises 84 and can receive products A and B from secondary vendor enterprises 86. Of course, the supply chain can be much more extensive, but is reduced to this size for ease of explanation. According to the teachings of the present invention, retailer enterprise 82, primary vendor enterprises 84, and secondary vendor enterprises 86 can be linked using a supply chain planning engine and EPI layers as described above. In addition, retailer 82 can have the supply chain planning engine associated with it and essentially control the operation of the supply chain. This retailer control can be common in a supply chain where a retailer enterprise 82, such as a Wal-Mart, generally manages its supply chain.

The integration of supply chain 80 allows retailer enterprise 82, for example, to communicate a request to primary vendor enterprises 84 for the respective products. The EPI protocol can define a window for a promise from primary vendor enterprises 84 to supply the requested products. Where there is one planning domain, simulations of plans for the supply chain can occur, for example, in five to ten minutes across the enterprises. Where there are multiple planner domains and there is sufficient available to promise, plan development can occur, for example, in one to two minutes across the enterprises.

Where there is insufficient available to promise and multiple planner domains, the window can be defined as a 2-hour window. If a promise is not received from a primary vendor enterprise 84 within the 2-hour window, retailer 82 can communicate a request to a secondary vendor enterprise 86 to obtain the necessary product. Again, a 2-hour window could be defined for a promise from secondary vendor enterprises 86. It should be understood that, in this manner, retailer enterprise 82 can timely inform the vendors in its supply chain of the products needed as well as avoid running out of certain products. The present invention provides a retailer enterprise 82 and vendor enterprises 84 and 86 with the ability to manage inventories and run a leaner supply chain than is possible with conventional planning systems.

Communication of Planning Information

Figure 5A:
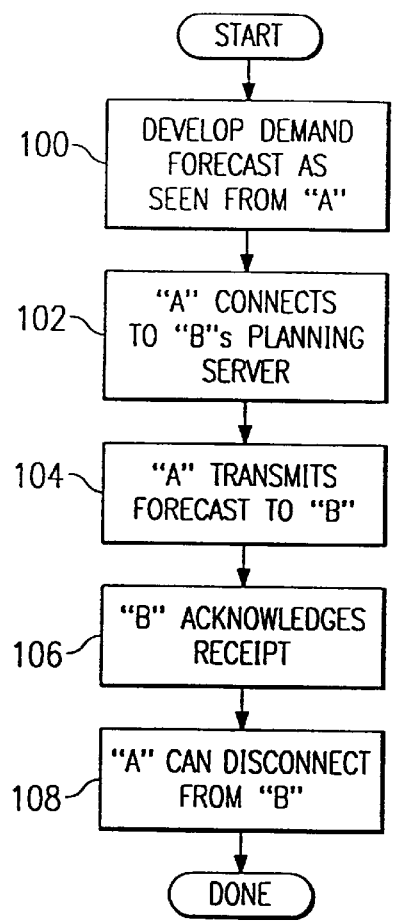
FIGS. 5A, 5B and 5C provide a flow chart of one embodiment of a method for managing demands communicated between enterprises in a supply chain according to the teachings of the present invention.
Figure 5C:
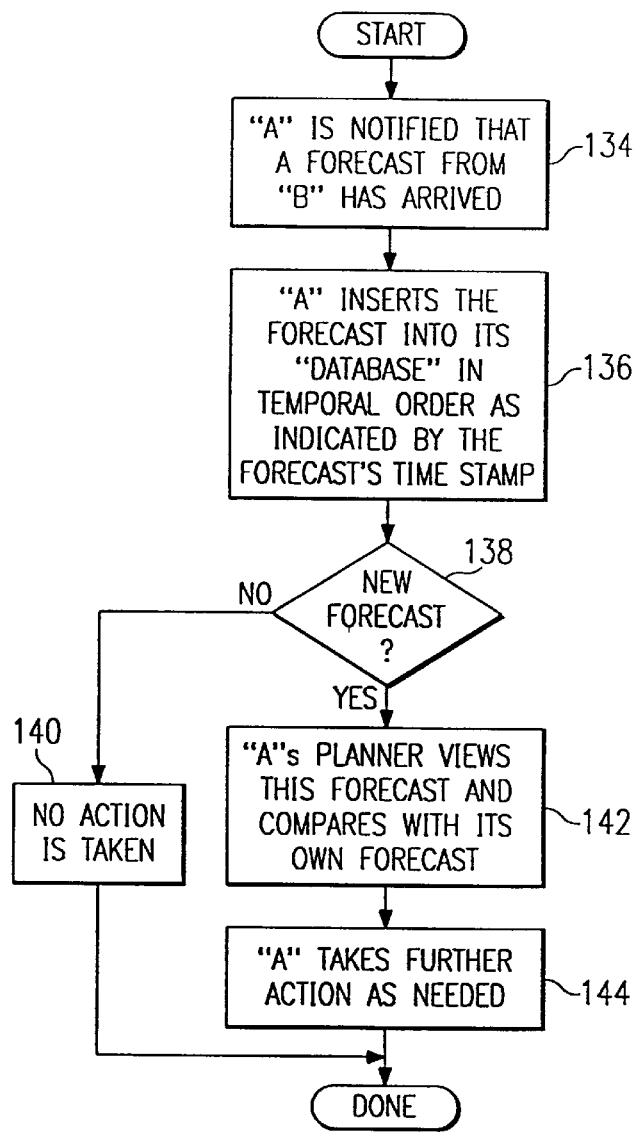
Figure 5B:
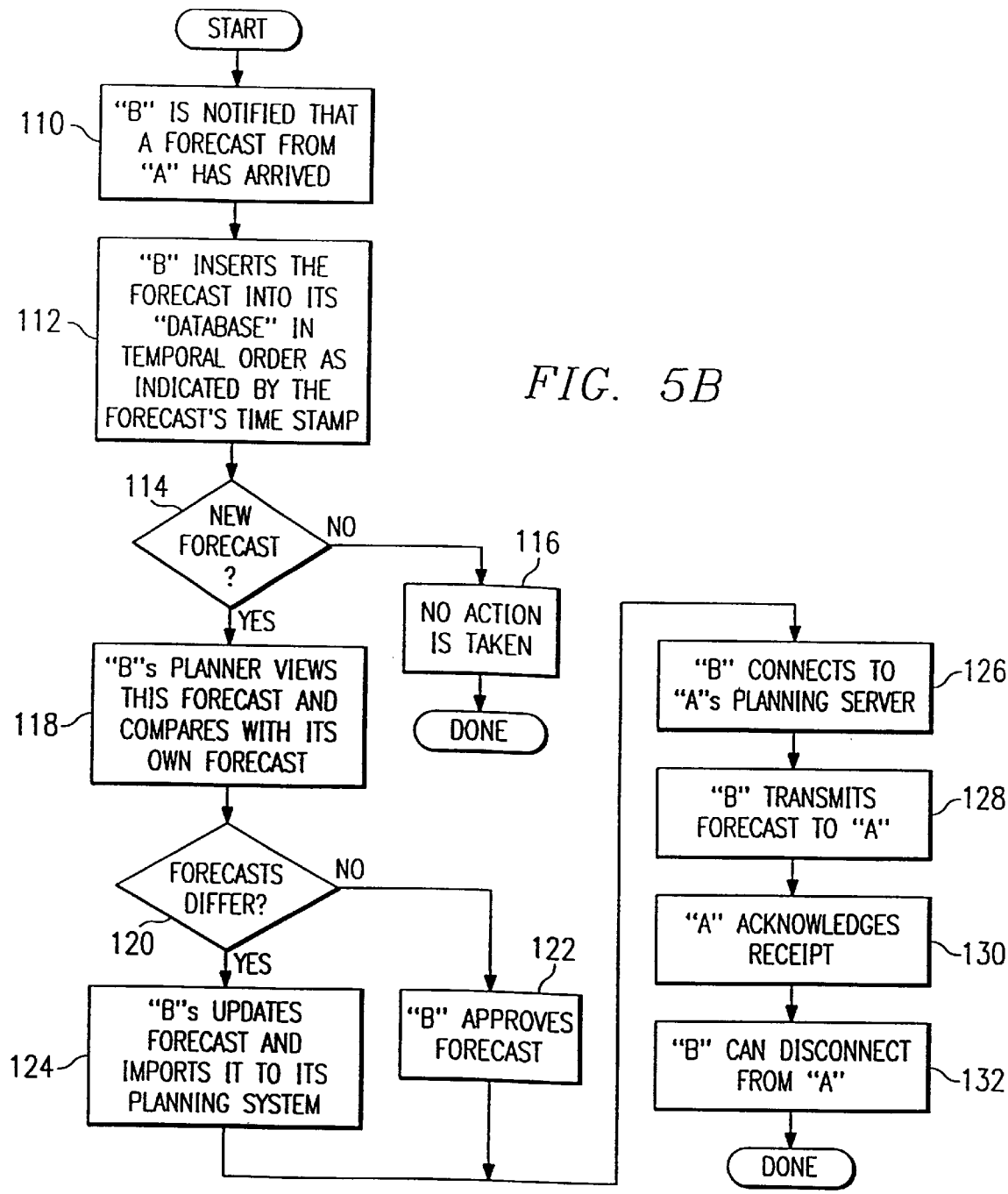

FIGS. 5A, 5B and 5C provide a flow chart of a method for managing demands communicated between enterprises in a supply chain according to the teachings of the present invention. The method of FIGS. 5A–5C contemplates, for example, the use of a public Internet, private intranet or direct dial servers for communication of information.

As shown in FIG. 5A, in step 100, an enterprise A develops a demand forecast. In step 102, enterprise A connects to enterprise B's planning server. In step 104, enterprise A transmits the demand forecast to enterprise B. Then, in step 106, enterprise B acknowledges receipt of enterprise A's demand forecast. In step 108, enterprise A can then disconnect from enterprise B's planning server.

As shown in FIG. 5B, in step 110, enterprise B is notified that a forecast has been received from enterprise A. In step 112, enterprise B inserts the demand forecast into its database, or transactional execution system, in temporal order as indicated by the forecast time stamp. In step 114, enterprise B determines whether the forecast is new. If not, in step 116, no action is taken, and enterprise B has completed processing the demand forecast. If the forecast is new, enterprise B, in step 118, has its planner view the demand forecast and compare it with its own demand forecast. In step 120, enterprise B then determines whether the forecasts differ. If not, in step 122, enterprise B approves the forecast. If so, in step 124, enterprise B updates its forecast and imports the updated forecast into its planning system. In step 126, enterprise B then connects to enterprise A's planning server. In step 128, enterprise B transmits its demand forecast to enterprise A. In step 130, enterprise A acknowledges receipt of the forecast, and, in step 132, enterprise B can disconnect from enterprise A.

As shown in FIG. 5C, in step 134, enterprise A is then notified that a forecast has been received from enterprise B. In step 136, enterprise A inserts the new forecast into its database in temporal order as indicated by the forecast time stamp. In step 138, enterprise A then determines whether the forecast is new. If not, in step 140, no action is taken by enterprise A. If so, in step 142, enterprise A's planner views the forecast and compares it with enterprise A's own forecast. In step 144, enterprise A takes further action as needed.

This process between enterprise A and enterprise B can continue such that both enterprises maintain demand forecasts that incorporate information available to both enterprises. The level at which this information is shared and communicated can be implemented as deeply as desired by the various enterprises. According to the teachings of the present invention, an EPI layer can be established and provide enterprises with a means for communicating information between one another and integrating that information into the supply chain planning.

Although the present invention has been described in detail, it should be understood that various modifications, substitutions, and alterations can be made hereto without departing from the intended scope as defined by the appended claims.

What is claimed is:

1. A system for extended enterprise planning across a supply chain, comprising:
   a first system associated with demand enterprises in a supply chain, comprising:
      a local plan for an operating environment of the demand enterprises;
      a first transactional execution system layer operable to execute said plan; and
      a first planning interchange layer in communication with the first transactional execution system layer, the first planning interchange layer providing a data specification format and an external communication interface for the first transactional execution system layer;
   a plurality of second systems associated with supply enterprises in different tiers of the supply chain, each second system comprising:
      a local plan for an operating environment of said supply enterprises;
      a second transactional execution system layer operable to execute said plan; and
      a second planning interchange layer in communication with the second transactional execution system layer, the second planning interchange layer providing a data specification format and an external communication interface for the second transactional execution system layer; and
   a third system, comprising:
      a supply chain model that models said demand enterprises and said supply enterprises;
      a supply chain planning engine operable to perform planning for the supply chain, said planning being based at least in part on demand forecast data; and
      a third planning interchange layer in communication with the supply chain planning engine, the third planning interchange layer providing a data specification format and an external communication interface for the supply chain planning engine; and
   a data access/transfer layer interconnecting and allowing transfer of said demand forecast data between the planning interchange layers;
   the data specification formats and external communication interfaces of the planning interchange layers thereby allowing concurrent transfer of planning information between the first, second and third systems;
   wherein any of said first or second systems may receive said demand forecast data directly communicated to it from another of said first or second systems, directly acknowledge receipt of said demand forecast data, and import said demand forecast data to its local plan;
   the supply chain planning engine thereby having access to the demand forecast data to provide constraint based extended enterprise planning across the supply chain.

2. The system of claim 1, wherein the planning interchange layers communicate using a data specification format comprising an electronic planning interchange data protocol.

3. The system of claim 2, wherein the electronic planning interchange data protocol defines a window of time in which supply information is to be sent in response to demand information.

4. The system of claim 1, wherein the first and second planning interchange layers are implemented by application program interfaces for the first and each second transactional execution systems.

5. The system of claim 1, wherein the supply chain planning engine is implemented by a planning engine that uses a flexible network based approach to model the supply chain.

6. The system of claim 1, wherein the first and second transactional execution systems are selected from the group consisting of ERP, DRP, and MRP planning systems.

7. The system of claim 1, wherein the data access/transfer layer is implemented using the public Internet.

8. The system of claim 1, wherein the data access/transfer layer is implemented through a value added network.

9. A method for extended enterprise planning across a supply chain, comprising:
   connecting a first planning interchange layer to a first transactional execution system layer associated with a demand enterprise in a supply chain, the first planning interchange layer providing a data specification format and an external communication interface for the first transactional execution system layer, said first transactional execution system layer operable to generate demand requests;
   connecting a plurality of second planning interchange to a plurality of second transactional execution system layers associated with supply enterprises in different tiers of the supply chain, the second planning interchange layers providing a data specification format and an external communication interface for the second transactional execution system layers, said second transactional execution system layers operable to generate promises in response to said demand requests;
   connecting a third federated electronic planning interchange layer to a supply chain planning engine operable to perform planning for the supply chain in response to said demand requests and said promises, the third planning interchange layer providing a data specification format and an external communication interface for the supply chain planning engine; and
   interconnecting the planning interchange layers with a data transfer layer, the first transactional execution system communicating said demand requests and each of the second transactional execution systems communicating said promises, such that any of said systems may directly communicate with another of said systems;
   the data specification formats and external communication interfaces of the planning interchange layers thereby allowing concurrent and direct transfer of said demand requests and said promises between the first and second systems;
   modeling said demand enterprise and said supply enterprises with a computer implemented supply chain model; and
   the supply chain planning engine thereby having access to the demand requests and promises and to said model, to provide constraint based extended enterprise planning across the supply chain.

10. The method of claim 9, wherein interconnecting the planning interchange layers comprises using a data specification format comprising an electronic planning interchange data protocol.

11. The method of claim 10, wherein the electronic planning interchange data protocol defines a window of time in which supply information is to be sent in response to demand information.

12. The method of claim 9, wherein connecting the first and the second planning interchange layers comprises implementing application program interfaces for the first and the second transactional execution systems.

13. The method of claim 9, wherein connecting the third planning interchange layer comprises connecting to a supply chain planning engine implemented using a flexible network based approach to model a supply chain.

14. The method of claim 9, wherein connecting the first and the second planning interchange layers comprises connecting to first and second transactional execution systems that are selected from the group consisting of ERP, DRP, and MRP planning systems.

15. The method of claim 9, wherein interconnecting is accomplished by a data access/transfer layer implemented using the public Internet.

16. The method of claim 9, wherein interconnecting is accomplished by a data access/transfer layer implemented through a value added network.

* * * * *

UNITED STATES PATENT AND TRADEMARK OFFICE
CERTIFICATE OF CORRECTION

PATENT NO.   : 5,974,395  
DATED        : October 26, 1999  
INVENTOR(S)  : Bellini et al.

It is certified that error appears in the above-identified patent and that said Letters Patent is hereby corrected as shown below:

<u>Column 12,</u>  
Line 11, after "interchange," insert -- layers --.

Signed and Sealed this

Tenth Day of September, 2002

*Attest:*

*Attesting Officer*

JAMES E. ROGAN  
*Director of the United States Patent and Trademark Office*

UNITED STATES PATENT AND TRADEMARK OFFICE
CERTIFICATE OF CORRECTION

PATENT NO. : 5,974,395
DATED : October 26, 1999
INVENTOR(S) : Joseph M. Bellini et al.

It is certified that error appears in the above-identified patent and that said Letters Patent is hereby corrected as shown below:

<u>Column 12,</u>
Line 30, after "interchange," insert -- layers --.

Signed and Sealed this

Sixth Day of January, 2004

JAMES E. ROGAN
*Director of the United States Patent and Trademark Office*